United States Patent
Qu et al.

(10) Patent No.: US 11,952,222 B2
(45) Date of Patent: Apr. 9, 2024

(54) MATERIAL CONVEYING DEVICE, PROCESSING EQUIPMENT FACILITATING MATERIAL DISTRIBUTION AND MATERIAL DISTRIBUTION METHOD

(71) Applicant: CHANGZHOU MINGSEAL ROBOT TECHNOLOGY CO., LTD., Changzhou (CN)

(72) Inventors: Dongsheng Qu, Changzhou (CN); Changfeng Li, Changzhou (CN); Junsheng Xia, Changzhou (CN); Jian Yang, Changzhou (CN); Hongjun Wu, Changzhou (CN); Feng Yin, Changzhou (CN); Jin Zha, Changzhou (CN); Kaicang Ruan, Changzhou (CN); Jiming Huang, Changzhou (CN); Fuliang Gao, Changzhou (CN); Dianqiu Zhou, Changzhou (CN)

(73) Assignee: CHANGZHOU MINGSEAL ROBOT TECHNOLOGY CO., LTD., Changzhou Jiangsu (CN)

( * ) Notice: Subject to any disclaimer, the term of this patent is extended or adjusted under 35 U.S.C. 154(b) by 0 days.

(21) Appl. No.: 17/656,580

(22) Filed: Mar. 25, 2022

(65) Prior Publication Data
US 2022/0212881 A1 Jul. 7, 2022

Related U.S. Application Data

(63) Continuation of application No. PCT/CN2020/132130, filed on Nov. 27, 2020.

(30) Foreign Application Priority Data

Dec. 6, 2019 (CN) .......................... 201911241389.8
Dec. 6, 2019 (CN) .......................... 201911242287.8
Mar. 24, 2020 (CN) .......................... 202010211359.9

(51) Int. Cl.
*B65G 47/52* (2006.01)
*B65G 47/91* (2006.01)

(52) U.S. Cl.
CPC .............. *B65G 47/52* (2013.01); *B65G 47/91* (2013.01)

(58) Field of Classification Search
CPC ........ B65G 47/52; B65G 47/91; B65G 15/10; B65G 47/642; B65G 35/06; B65G 47/912; B65G 2201/02; B05C 13/00
See application file for complete search history.

(56) References Cited

U.S. PATENT DOCUMENTS 2,377,294 A * 5/1945 Hullhorst ............. B21D 51/446
198/431
7,677,543 B2 3/2010 Gulbrandsen et al.
(Continued)

FOREIGN PATENT DOCUMENTS

CN 103081587 5/2013
CN 105775674 7/2016
(Continued)

OTHER PUBLICATIONS

English translation of Office Action from related Taiwanese Appln. No. 110144279 dated Nov. 10, 2022. 20 pages.
(Continued)

*Primary Examiner* — Gene O Crawford
*Assistant Examiner* — Abby A Jorgensen
(74) *Attorney, Agent, or Firm* — Grossman, Tucker, Perreault & Pfleger, PLLC.

(57) ABSTRACT

A material conveying device includes a base frame, a first conveying unit, a second conveying unit and a transfer assembly. The first conveying unit is provided on the base frame, the second conveying unit is provided on the base frame, and the transfer assembly is provided on the base
(Continued)

frame and can transfer a material between the first conveying unit and the second conveying unit. The present disclosure further provides a processing equipment facilitating material distribution and a material distribution method.

13 Claims, 10 Drawing Sheets

(56) References Cited

U.S. PATENT DOCUMENTS

| | | | | |
|---|---|---|---|---|
| 10,843,880 B2 * | 11/2020 | Ragan | ............... | B65G 35/06 |
| 2005/0285323 A1 * | 12/2005 | Gulbrandsen | ........ | B65H 39/043 |
| | | | | 271/9.11 |
| 2015/0060234 A1 * | 3/2015 | Kurachi | ............ | B65B 5/101 |
| | | | | 198/370.03 |
| 2018/0134422 A1 * | 5/2018 | Kurachi | ............ | B65B 25/14 |

FOREIGN PATENT DOCUMENTS

| | | | | | |
|---|---|---|---|---|---|
| CN | 105775674 A | * | 7/2016 | ............ | B65G 43/10 |
| CN | 105775674 A | | 7/2016 | | |
| CN | 206999362 | | 2/2018 | | |
| CN | 207158194 | | 3/2018 | | |
| CN | 107902356 A | * | 4/2018 | ............ | B65G 37/00 |
| CN | 108100545 | | 6/2018 | | |
| CN | 207917870 U | * | 9/2018 | ............ | B65G 37/00 |
| CN | 109081069 | | 12/2018 | | |
| CN | 208585791 | | 3/2019 | | |
| CN | 208585791 U | * | 3/2019 | | |
| CN | 209275615 | | 8/2019 | | |
| CN | 209275615 U | * | 8/2019 | | |
| CN | 110237974 | | 9/2019 | | |
| CN | 209720719 | | 12/2019 | | |
| CN | 110803474 | | 2/2020 | | |
| CN | 111038941 | | 4/2020 | | |
| CN | 111282781 | | 6/2020 | | |
| CN | 211443908 | | 9/2020 | | |
| CN | 212370507 | | 1/2021 | | |
| JP | H04176528 A | | 6/1992 | | |
| KR | 101715314 B1 | * | 3/2017 | | |
| TW | M394979 U1 | | 12/2010 | | |
| TW | 201311536 A1 | | 3/2013 | | |
| WO | WO-2018067567 A1 | * | 4/2018 | ........... | B65G 17/002 |

OTHER PUBLICATIONS

Office Action from related Taiwanese Appln. No. 110144279 dated Nov. 10, 2022.
English translation of International Search Report from corresponding PCT Appln. No. PCT/CN2020/132130, dated Mar. 1, 2021.
First Office Action from Chinese Application No. 201911242287.8, dated Dec. 18, 2020.
Second Office Action from Chinese Application No. 201911242287.8, dated Jun. 28, 2021.
Notice of Reasons for Refusal from Japanese Corresponding Application 2022-514625 dated Apr. 19, 2023 English translation attached.
Hearing Notice from India Corresponding Application No. 202227016257, dated Aug. 2, 2023, English translation incorporated. (2 pages).

* cited by examiner

MATERIAL CONVEYING DEVICE, PROCESSING EQUIPMENT FACILITATING MATERIAL DISTRIBUTION AND MATERIAL DISTRIBUTION METHOD

CROSS-REFERENCE TO RELATED APPLICATIONS

This application is a continuation of International Application No. PCT/CN2020/132130 filed on Nov. 27, 2020, which priority to Chinese patent application No. 201911241389.8 entitled "PROCESSING EQUIPMENT FACILITATING MATERIAL DISTRIBUTION", filed Dec. 6, 2019, Chinese patent application No. 201911242287.8 entitled "MATERIAL DISTRIBUTION METHOD AND APPARATUS, COMPUTER STORAGE MEDIUM, AND ELECTRONIC DEVICE", filed Dec. 6, 2019, and Chinese patent application No. 202010211359.9 entitled "MATERIAL CONVEYING DEVICE AND PARALLEL ADHESIVE DISPENSING ROBOT HAVING THE SAME", filed Mar. 24, 2020, all of which are incorporated herein by reference in their entirety.

FIELD

The present disclosure relates to the field of rail conveyance technology, and more particularly, to a material conveying device, a processing equipment facilitating material distribution and a material distribution method.

BACKGROUND

Currently, with the continuous development and progress of the industry, reducing labor costs and building unmanned workshops have become a trend for future manufacture factories. In order to realize a highly automatic unmanned workshop, production devices in various production processes need to be connected so as to obtain a continuous production line. Currently, devices are usually connected by a conventional single-rail serial connection way. However, the single-rail serial connection has a lot of disadvantages such as stoppage of a whole production line due to behaviors such as inspection, adjustment and test of an individual device in the production line, and too long-time cost in waiting and delivery of products on the rail due to mutual interference between production and conveyance of products on the single rail, which decrease the production efficiency greatly.

SUMMARY

The present disclosure aims to solve at least one of the technical problems in the prior art.

To this end, the present disclosure provides a material conveying device which is convenient to use and can effectively raise the production efficiency.

The present disclosure further provides a processing equipment facilitating material distribution.

The present disclosure further provides a material distribution method.

According to embodiments of the present disclosure, a material conveying device is provided. The material conveying device includes a base frame, a first conveying unit, a second conveying unit and a transfer assembly. The first conveying unit is provided on the base frame, the second conveying unit is provided on the base frame, and the transfer assembly is provided on the base frame and is configured to transfer a material between the first conveying unit and the second conveying unit.

In the material conveying device according to the embodiments of the present disclosure, the transfer assembly can move between a port position of the first conveying unit and a port position of the second conveying unit to achieve the transfer and distribution of the material between the first conveying unit and the second conveying unit. In this way, the material conveying device can selectively transfer the material to a corresponding one of the first conveying unit and the second conveying unit according to a different production process. Therefore, the material conveying device has advantages such as a high production efficiency, a high flexibility and a high adaptability for mass production of products.

According to some embodiments of the present disclosure, the transfer assembly includes a material reversing module and a material fetching module. The material reversing module is provided on the base frame and is movable between the first conveying unit and the second conveying unit. The material fetching module is connected with the material reversing module and is configured to move between a port position of the first conveying unit and a port position of the second conveying unit when driven by the material reversing module to transfer the material between the first conveying unit and the second conveying unit.

According to some embodiments of the present disclosure, the transfer assembly further includes an elevating module connected with each of the material reversing module and the material fetching module. The elevating module is configured to raise or lower a height where the material fetching module is located.

According to some embodiments of the present disclosure, the material reversing module includes a reversing movement member and a reversing driving member. The reversing movement member is provided on the base frame and is connected with the elevating module, the reverse driving member is provided on the base frame and is connected with the reversing movement member, and the reverse driving member is configured to drive the reversing movement member to move. The elevating module includes an elevation moving member and an elevation driving member. The elevation moving member is connected with both of the reversing movement member and the material fetching module. The elevation driving member is connected with the elevation moving member to drive the elevation moving member to drive the material fetching module to fetch the material from the first conveying unit or the second conveying unit or to place the material onto the first conveying unit or the second conveying unit.

According to some embodiments of the present disclosure, the reversing movement member includes a reversing movement member base plate, a reversing movement member body and a reversing movement member moving block. The reversing movement member base plate is provided on the base frame, the reversing movement member body is connected with the base frame by the reversing movement member base plate, the reversing movement member body is provided between the first conveying unit and the second conveying unit, and the reversing movement member moving block is movably provided on the reversing movement member body. The elevation moving member includes an elevation moving member base plate, an elevation moving member body, an elevation moving member screw pair and an elevation moving member sliding pair. The elevation moving member base plate is connected with the reversing movement member moving block, the elevation moving member body is connected with the elevation moving member base plate, the elevation moving member screw pair is connected with the elevation driving member, the elevation moving member sliding pair is connected with both of the elevation moving member screw pair and the material fetching module, and the elevation moving member sliding pair is configured to drive the material fetching module to move up and down on the elevation moving member body by the elevation moving member screw pair.

According to some embodiments of the present disclosure, the material fetching module includes: a bracket base plate connected with the elevation moving member screw pair, a bracket connected with the bracket base plate; and a suction member connected with the bracket and configured to generate a suction force on the material.

According to some embodiments of the present disclosure, the first conveying unit and the second conveying unit each include a sliding rail provided thereon with a transmission member for bearing and conveying the material. The number of the sliding rails is two. The two sliding rails are provided spaced apart from and opposite to each other. The distance between the two sliding rails is adjustable.

According to some embodiments of the present disclosure, an operational unit is provided on the first conveying unit and/or the second conveying unit.

According to some embodiments of the present disclosure, the first conveying unit includes an operation rail, the operation unit is provided on the first conveying unit, the second conveying unit includes a common conveying rail, the transfer assembly includes a connection rail movably provided on the base frame, the connection rail is positioned at one side or other side of the common conveying rail and the operation rail. When the connection rail is positioned at the one side of the common conveying rail and the connection rail, the material is conveyed to a feed port of the common conveying rail or the operation rail via a discharge port of the connection rail. When the connection rail is positioned at the other side of the common conveying rail and the operation rail, the material is conveyed from a discharge port of the common conveying rail or the operation rail to a feed port of the connection rail.

According to embodiments of the present disclosure, a processing equipment facilitating material distribution is provided. The processing equipment includes at least two material conveying devices as described above which are connected in series. The transfer assembly is provided at each of a feed side and a discharge side of each of the at least two material conveying devices.

According to embodiments of the present disclosure, a material distribution method is provided, using the processing equipment facilitating material distribution described above. The material distribution method includes: S1, determining whether there is a material being processed on the first conveying unit of one material conveying device; S2, conveying a next material after the material to the transfer assembly positioned at one side of the one material conveying device along a conveying direction; and S3, conveying by the transfer assembly positioned at the one side of the one material conveying device, the next material to the second conveying unit of the one material conveying device and transferring by the transfer assembly between two material conveying devices adjacent to each other, the next material to the first conveying unit or the second conveying unit of another material conveying device, when the material is being processed on the first conveying unit of the one material conveying device.

According to some embodiments of the present disclosure, the material distribution method further includes: S4, transferring, after the material on the first conveying unit of the one material conveying device is processed, by the transfer assembly between the two material conveying devices adjacent to each other, the processed material to the first conveying unit or the second conveying unit of another material conveying device.

Additional aspects and advantages of the present disclosure will be given partially in the following description, or become apparent partially from the following description, or can be learned from practice of the present disclosure.

BRIEF DESCRIPTION OF DRAWINGS

The above and/or additional aspects and advantages of the present disclosure will become apparent and easy to understand from the description of embodiments below in conjunction with the accompanying drawings, in which.

REFERENCE NUMERALS

Figure 1A:
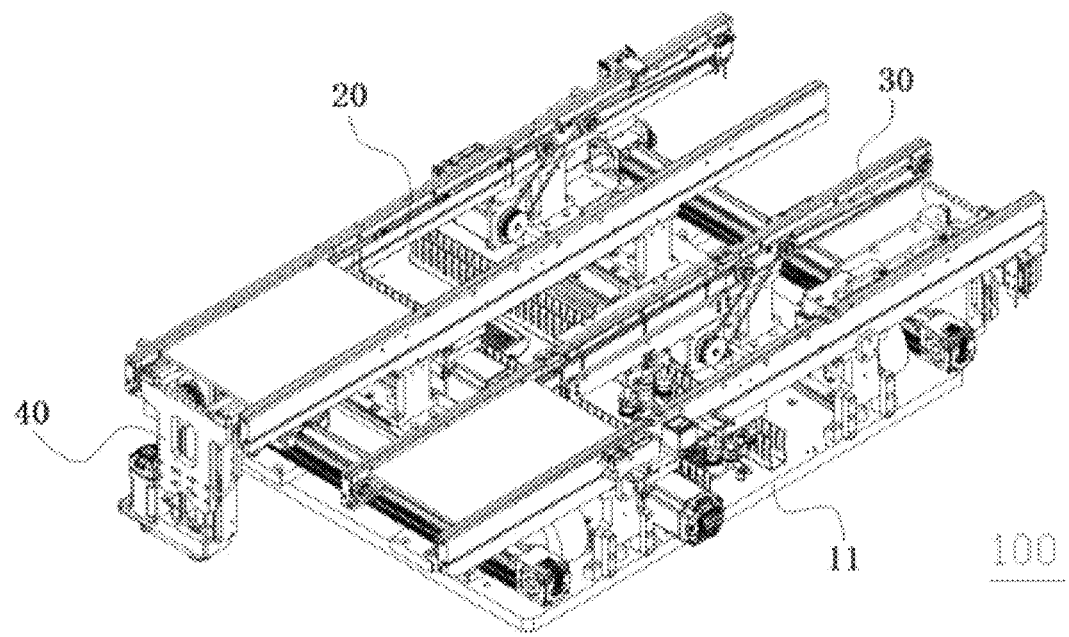
FIG. 1a to FIG. 1f are schematic diagrams illustrating switched working states of a material conveying device according to embodiments of the present disclosure, in which a material is transferred from a conveying unit at one side to a conveying unit at another side by a transfer assembly.

Material conveying device 100; Processing equipment 10; Base frame 11; Operation rail 12; Common conveying rail 13; Connection rail 14; Sliding rail 15; First conveying unit 20; Second conveying unit 30; Transfer assembly 40; Material reversing module 41; Material fetching module 42; Bracket base plate 42a; Bracket 42b; Suction member 42c; Elevating module 43; Elevation driving member 43b; Elevation moving member base plate 43c; Elevation moving member body 43d; Elevation moving member screw pair 43e; Elevation moving member sliding pair 43f; Reversing movement member 44; Reversing movement member base plate 44a; Reversing movement member body 44b; Reversing movement member moving block 44c; Reverse driving member 45; Material 200.

DETAILED DESCRIPTION

The present disclosure will be described in further detail below in conjunction with the accompanying drawings. The drawings are simplified schematics, and only illustrate basic structures of the present disclosure in a schematic way and therefore only display components related to the present disclosure.

A material conveying device 100 according to embodiments of the present disclosure will be described in detail below with reference to the accompanying drawings.

As illustrated in FIG. 1a to FIG. 1f and FIG. 2 to FIG. 5, the material conveying device 100 according to the embodiments of the present disclosure includes a base frame 11, a first conveying unit 20, a second conveying unit 30 and a transfer assembly 40. In particular, the first conveying unit 20 is provided on the base frame 11, the second conveying unit 30 is provided on the base frame 11, and the transfer assembly 40 is provided on the base frame 11. The transfer assembly 40 is configured to transfer a material 200 between the first conveying unit 20 and the second conveying unit 30.

In other words, the base frame 11 is installed thereon with the first conveying unit 20 and the second conveying unit 30, and when a material is supplied in a previous procedure, the transfer assembly 40 may transfer the supplied material to the first conveying unit 20 or the second conveying unit 30 according to process requirements. In particular, the transfer assembly 40 is provided on the base frame 11 and is able to move back and forth between a port position of the first conveying unit 20 and a port position of the second conveying unit 30, so as to transfer the material 200 between the first conveying unit 20 and the second conveying unit 30. In this way, the material conveying device 100 has advantages such as a high production efficiency, a high flexibility and a high adaptability for mass production of products.

It needs to be noted that, the port position of the first conveying unit 20 and the port position of the second conveying unit 30 each may be a feed port position or a discharge port position. Each of the first conveying unit 20 and the second conveying unit 30 may have a conveying unit such as a conveyor belt, an air cylinder, a linear motor, a belt driver, a chain driver, a magnetic gear, etc.

Therefore, in the material conveying device 100 according to the embodiments of the present disclosure, the transfer assembly 40 can move between a port position of the first conveying unit 20 and a port position of the second conveying unit 30 to achieve the transfer and distribution of the material 200 between the first conveying unit 20 and the second conveying unit 30. In this way, the material conveying device 100 can selectively transfer the material 200 to a corresponding one of the first conveying unit 20 and the second conveying unit 30 according to a different production process. Therefore, the material conveying device 100 has advantages such as a high production efficiency, a high flexibility and a high adaptability for mass production of products.

As illustrated in FIG. 2 to FIG. 5, the transfer assembly 40 includes a material reversing module 41 and a material fetching module 42. The material reversing module 41 is provided on the base frame 11 and is movable between the first conveying unit 20 and the second conveying unit 30. The material fetching module 42 is connected with the material reversing module 41 and is configured to move between a port position of the first conveying unit 20 and a port position of the second conveying unit 30 when driven by the material reversing module 41 so as to transfer the material 200 between the first conveying unit 20 and the second conveying unit 30. In particular, the base frame 11 is provided thereon with the material reversing module 41, and the material reversing module 41 can drive the material fetching module 42 connected thereto to move back and forth between the port position of the first conveying unit 20 and the port position of the second conveying unit 30, so as to enable transfer the material 200 between the first conveying unit 20 and the second conveying unit 30.

As illustrated in FIG. 2 to FIG. 5, the transfer assembly 40 further includes an elevating module 43. The elevating module 43 is connected with each of the material reversing module 41 and the material fetching module 42. The elevating module 43 is configured to raise or lower a height at which the material fetching module 42 is located. That is, the elevating module 43 is able to move the material fetching module 42 to the height corresponding to the port position of the first conveying unit 20 or the port position of the second conveying unit 30.

Further, the material reversing module 41 includes a reversing movement member 44 and a reverse driving member 45. The reversing movement member 44 is provided on the base frame 11 and is connected with the elevating module 43. The reverse driving member 45 is provided on the base frame 11 and is connected with the reversing movement member 44. The reverse driving member 45 is configured to drive the reversing movement member 44 to move and thus drive the elevating module 43 to move.

Optionally, the reversing movement member 44 includes a reversing movement member base plate 44a, a reversing movement member body 44b and a reversing movement member moving block 44c. The reversing movement member base plate 44a is provided on the base frame 11. The reversing movement member body 44b is connected with the base frame 11 by the reversing movement member base plate 44a. The reversing movement member base plate 44a is able to fix the reversing movement member body 44b onto the base frame 11. The reversing movement member body 44b is provided between the first conveying unit 20 and the second conveying unit 30. The reversing movement member moving block 44c is movably provided on the reversing movement member body 44b.

That is, the material reversing module 41 can achieve a transverse movement. The reverse driving member 45 may include a reverse driving motor, a reverse driving pulley pair and a reverse driving installation support. The transverse movement is performed as follows. A host controls the reverse driving motor to be powered on so as to drive the reverse driving pulley pair to rotate in a clockwise or counterclockwise way. One end of the reverse driving pulley pair is mounted on an output shaft of the reverse driving motor and the other end of the reverse driving pulley pair is mounted on an input shaft of the reversing movement member body, the rotation movement of the reverse driving motor can therefore be converted into a back-and-forth movement of the reversing movement member moving block 44c.

The reverse driving installation support can have the function of fixing the positions of the reverse driving member 45 and the reversing movement member 44 relative to each other. The reverse driving pulley pair, as a revolute pair, is formed of a set of synchronous pulleys and belts. The reversing movement member moving block 44c can fix the elevating module 43 and drive the elevating module 43 to perform a back-and-forth movement on the material reversing module 41.

As illustrated in FIG. 2 to FIG. 5, according to an embodiment of the present disclosure, the elevating module 43 includes an elevation moving member and an elevation driving member 43b. The elevation moving member is connected with both of the reversing movement member 44 and the material fetching module 42. The elevation moving member 43b is connected with the elevation moving member to drive the elevation moving member to drive the material fetching module 42 to fetch the material 200 from a transmission member or place the material 200 onto the first conveying unit 20 or the second conveying unit 30. The elevation driving member 43b includes an elevation driving motor, a reverse elevating pulley pair and an elevation driving installation support.

In some specific embodiments of the present disclosure, the elevation moving member includes an elevation moving member base plate 43c, an elevation moving member body 43d, an elevation moving member screw pair 43e and an elevation moving member sliding pair 43f. The elevation moving member base plate 43c is connected with the reversing movement member moving block 44c, the elevation moving member body 43d is connected with the elevation moving member base plate 43c, the elevation moving member screw pair 43e is connected with the elevation driving member 43b, the elevation moving member sliding pair 43f is connected with both of the elevation moving member screw pair 43e and the material fetching module 42, and the elevation moving member sliding pair is configured to drive the material fetching module 42 to move up and down on the elevation moving member body 43d by the elevation moving member screw pair 43e.

The elevation moving member drives the material fetching module 42 to move up and down in the following workflow. A host controls the elevation driving motor to be powered on to drive an elevation pulley pair to rotate in a clockwise or counterclockwise way. One end of the elevation pulley pair is mounted on an output shaft of the elevation driving motor and the other end of the elevation pulley pair is mounted on an input shaft of the elevation moving member screw pair 43e, the rotation movement of the reverse driving motor can therefore be converted into the up-and-down movement of the elevation moving member sliding pair 43f. The elevation moving member base plate 43c can have the function of fixing the positions of the reversing movement member moving block 44c and the elevating module 43 relative to each other. The elevation driving installation support can have the function of fixing the positions of the elevation driving motor and the elevation pulley pair relative to each other. The elevation pulley pair, as a revolute pair, is formed of a set of synchronous pulleys and belts. The elevation moving member screw pair 43e, as a revolute pair, is formed of a set of screw rods and screw nuts. The elevation moving member sliding pair 43f is able to fix a material plate bracket module (the material fetching module 42) and drive, by the elevation moving member screw pair 43e, the material plate bracket module to move up and down on the elevation moving member body 43d.

It needs to be noted that, a driving unit of the elevating module may be a screw motor, an air cylinder, a linear motor, a belt driver, a chain driver, a magnetic gear, etc.

Figure 2:
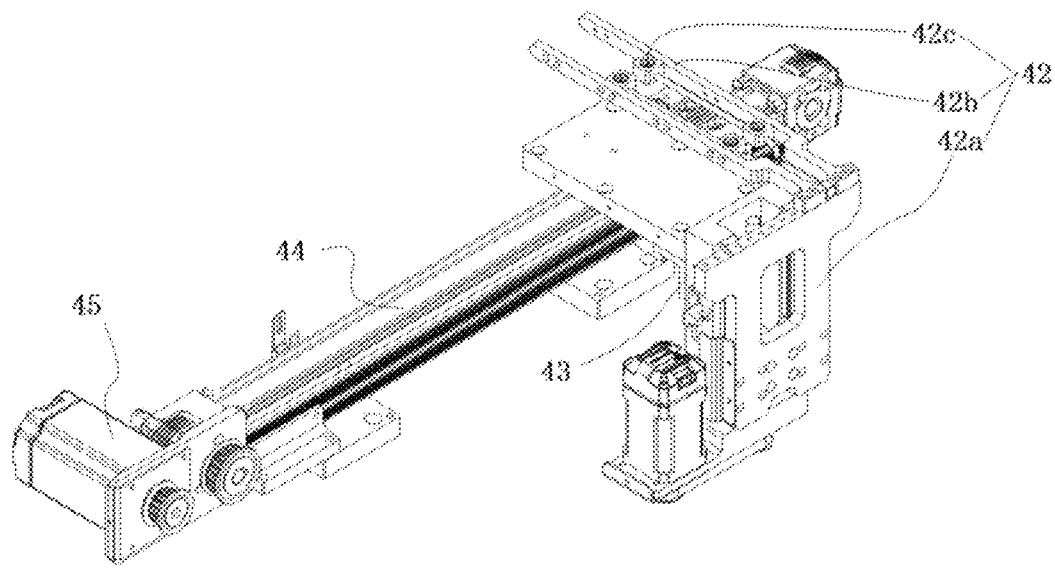
FIG. 2 is a schematic stereoscopic diagram illustrating a transfer assembly of a material conveying device according to an embodiment of the present disclosure.
Figure 3:
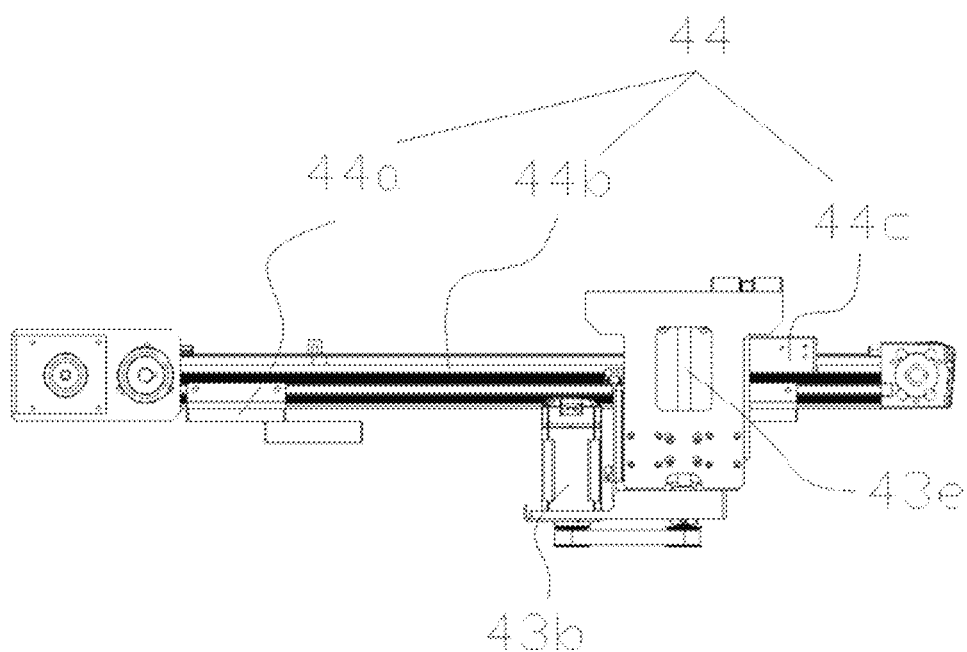
FIG. 3 is a schematic front view of the transfer assembly of the material conveying device according to the embodiment of the present disclosure.

As illustrated in FIG. 2, according to an embodiment of the present disclosure, the material fetching module 42 includes a bracket base plate 42a, a bracket 42b and a suctioning member 42c. The bracket base plate 42a is connected with the elevating module 43, the bracket 42b is connected with the bracket base plate 42a, and the suctioning member 42c is connected with the bracket 42b and is configured to generate a suction force on the material 200.

Further, the suction member 42c includes a sucking disc. The sucking disc is provided with a bearing surface for suctioning the material 200, and the position of the sucking disc on the bracket 42b is adjustable. The sucking disc may have the functions of buffering and supporting, and can increase, through a negative pressure thereof, a positive pressure on the material 200 so as to avoid the material 200 from shifting during the reversing process.

In some specific embodiments of the present disclosure, the first conveying unit 20 and the second conveying unit 30 each include a sliding rail 15. The sliding rail 15 is provided thereon with a transmission member such as conveyor belt for bearing and conveying the material 200. Further, the number of the sliding rails 15 is two. The two sliding rails 15 are provided spaced apart from and opposite to each other. A distance between the two sliding rails 15 is adjustable. Materials 200 having different sizes can be conveyed by adjusting the distance between the two sliding rails 15.

The first conveying unit 20 and/or the second conveying unit 30 may be provided with an operation unit. The operation unit of the first conveying unit 20 may be the same as or different from that of the second conveying unit 30, thereby implementing the same producing process or different producing processes. When one of the first conveying unit 20 and the second conveying unit 30 is provided with an operation unit while the other is not, the first conveying unit 20 and the second conveying unit 30 may be used as an operation unit and a common conveying unit respectively. Further, the material conveying device 100 according to embodiments of the present disclosure may be provided with a material detection member for cooperation. The material detection member is configured to determine onto which of the first conveying unit 20 and the second conveying unit 30 the material 200 is to be conveyed. When each of the first conveying unit 20 and the second conveying unit 30 is provided with an operation unit, and one of the first conveying unit 20 and the second conveying unit 30 has its corresponding operation unit stop working, the transfer assembly 40 can automatically transfer a supplied material to the corresponding operation unit of the other of the first conveying unit 20 and the second conveying unit 30.

According to an embodiment of the present disclosure, an activity space is provided between a port position of the first conveying unit 20 and the transfer assembly 40, and between a port position of the second conveying unit 30 and the transfer assembly 40. In other words, the transfer assembly 40 can move in this activity space to enable a back-and-forth transfer of the material 200 between the first conveying unit 20 and the second conveying unit 30. The activity space includes an upper activity space positioned above the first conveying unit 20 and the second conveying unit 30 and a lower activity space positioned below the first conveying unit 20 and the second conveying unit 30. Through the provision of the upper activity space, the transfer assembly 40 can drive the material 200 to transfer back and forth between the first conveying unit 20 and the second conveying unit 30. Through the provision of the lower activity space, the transfer assembly 40 can quickly return and wait for a next material 200 after placing a material 200 onto a corresponding sliding rail 15.

The working flow of the material conveying device 100 according to embodiments of the present disclosure will be described in detail below.

Figure 1B:
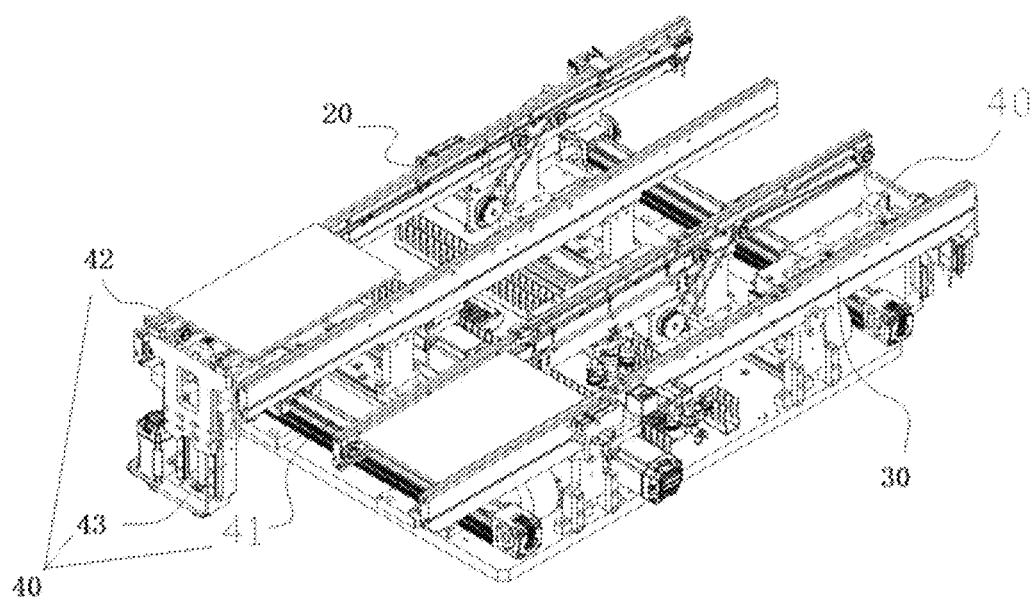
Figure 1C:
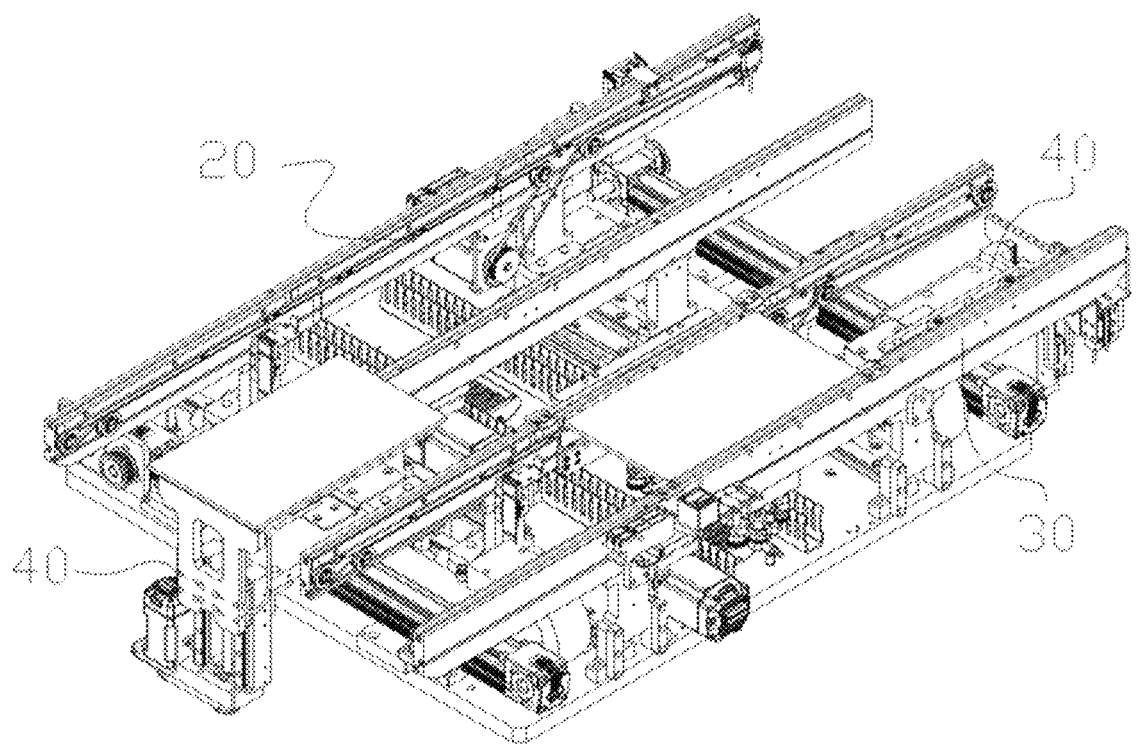
Figure 1D:
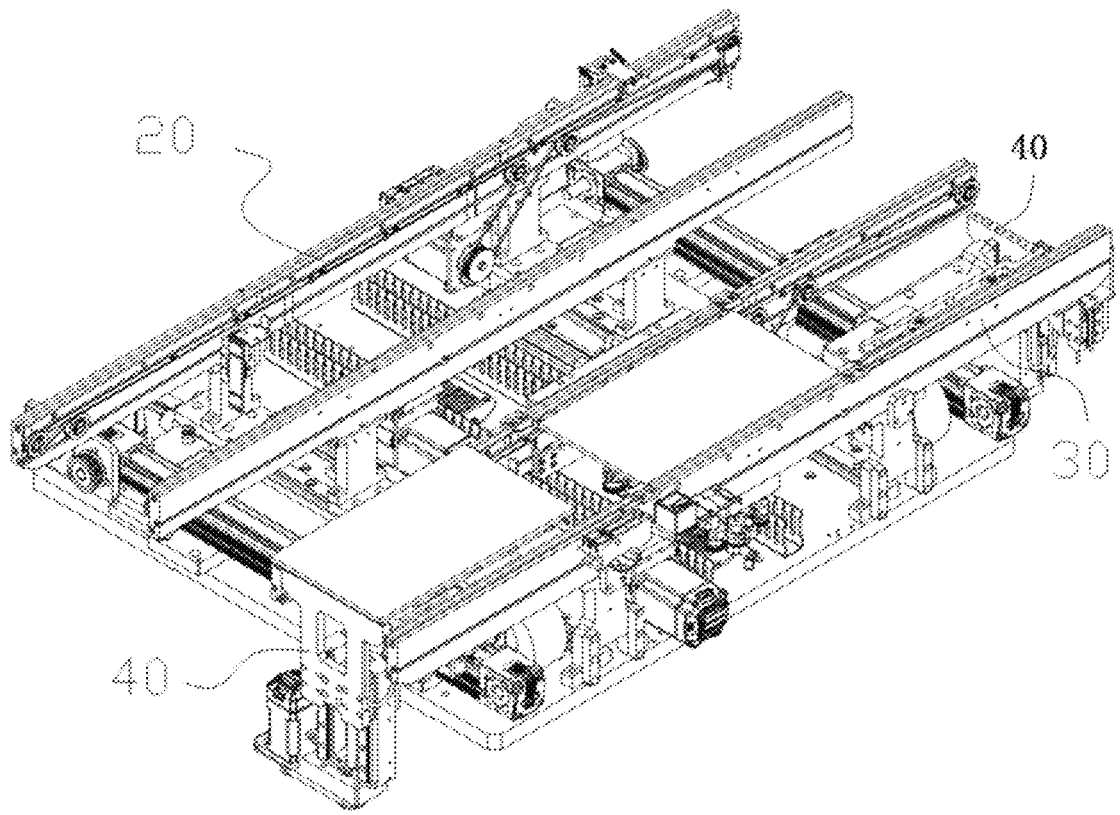
Figure 1E:
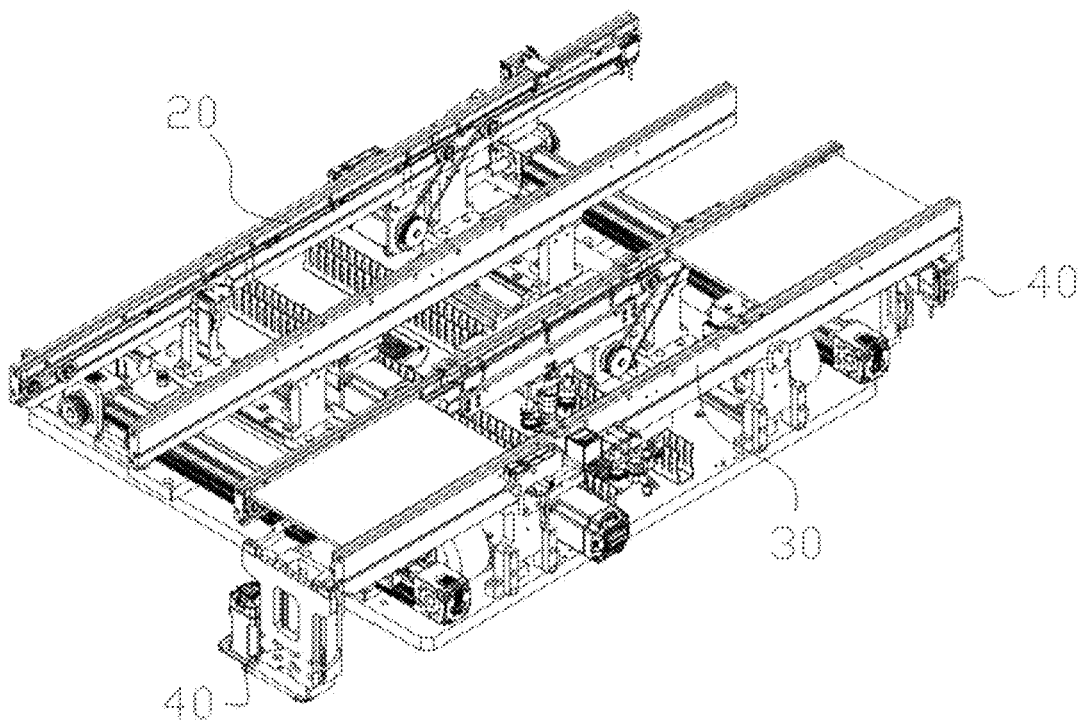
Figure 1F:
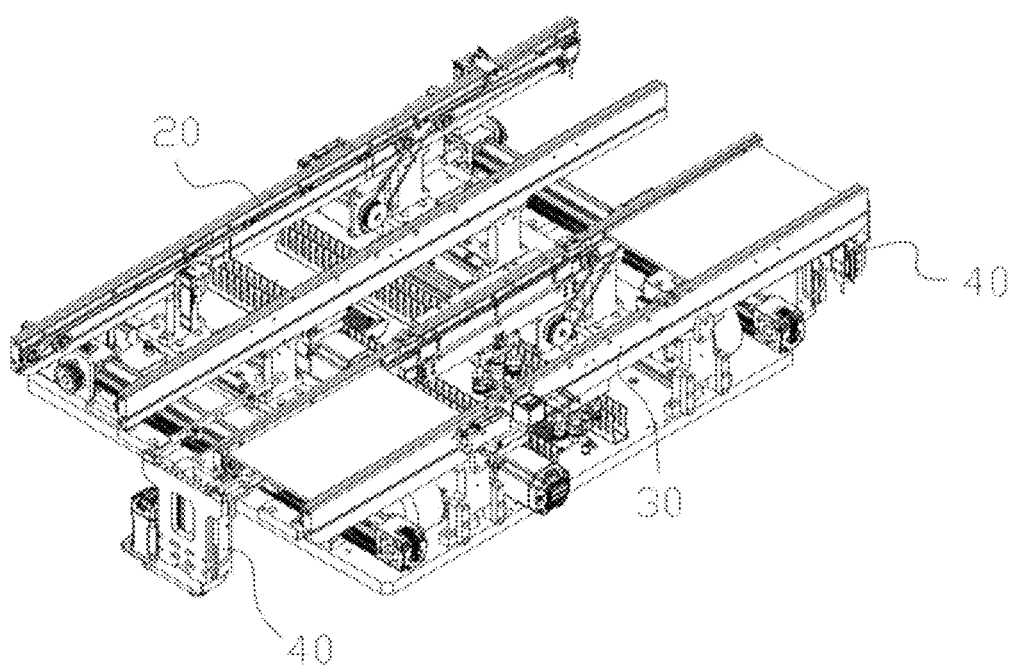

(1) Material loading process. As illustrated in FIG. 1a, a material 200 is conveyed from a position in a previous working procedure to a feed port position of the first conveying unit 20 or the second conveying unit 30. A sensed photoelectric signal is transmitted to the host. As illustrated in FIG. 1b, the elevating module 43 is controlled to be raised from a position below the sliding rail 15 of the first conveying unit 20 or the second conveying unit 30 and to raise the material 200 upward to a position above the sliding rail 15. As illustrated in FIG. 1c and FIG. 1d, then the material 200 is driven by the elevating module 43 to transversely move to a position above the second conveying unit 30 or the first conveying unit 20. As illustrated in FIG. 1e, the elevating module 43 is lowered to allow the material 200 to completely fall onto a conveyor belt of the second conveying unit 30 or the first conveying unit 20. As illustrated in FIG. 1f, when the material 200 is conveyed to a corresponding sliding rail 15, the host controls a main conveying module to convey the material 200 to a working area, and at the same time, the elevating module 43 returns to a material waiting and raising area from the position below the second conveying unit 30 or the first conveying unit 20.

(2) Material unloading process (taking, as an example, a case in which a material 200 on the first conveying unit 20 corresponding to a previous process is unloaded and the material 200 is conveyed onto the second conveying unit 30 corresponding to a next process). When the processing on the material 200 is finished, the material 200 is controlled by the host to be conveyed to a material waiting area of the first conveying unit 20 corresponding to the previous process, a sensed photoelectric signal is transmitted to the host, and the elevating module 43 is controlled to be raised from a position below the sliding rail 15 of the first conveying unit 20 corresponding to the previous process to raise the material 200 upward to a position above the first conveying unit 20 corresponding to the previous process. The material 200 is driven by the elevating module 43 to transversely move to a position above the sliding rail 15 of the second conveying unit 30 corresponding to the next process, and the elevating module 43 is lowered to allow the material 200 to completely fall onto a conveyor belt of the second conveying unit 30 corresponding to the next process, and then the host controls the second conveying unit 30 corresponding to the next process to convey the material 200 to a material waiting area at a discharge port, and at the same time, the elevating module 43 returns to a material waiting and raising area for the processed material from a position below the second conveying unit 30 corresponding to the next process.

In sum, the material conveying device 100 according to the embodiments of the present disclosure is mainly composed of the base frame 11, the first conveying unit 20, the second conveying unit 30 and the transfer assembly 40. The material conveying device 100 can enable combination of rail conveyance with elevation, reverse and connection, realize mass production in a controlled and automatic way, improve the production efficiency, and be adapted for a single process or multiple processes. The material conveying device has advantages such as saving manpower and energies, avoiding disadvantages arising from the manual operation, meeting the technical requirements for mass industrial production and complete inspection of products better and perfectly realizing traceability and processing uniformity of products. The material conveying device 100 according to the embodiments of the present disclosure has a high automation degree and can greatly improve product qualification ratio by combination with newly developed visual control and detection technologies, and can minimize the error-detection rate and the omission ratio.

According to an embodiment of the present disclosure, as illustrated in FIG. 6 to FIG. 12, the first conveying unit 20 includes an operation rail 12, and an operation unit is provided on the first conveying unit 20. The second conveying unit 30 includes a common conveying rail 13. The transfer assembly includes a connection rail 14 which is movably provided on the base frame 11. The connection rail 14 is positioned at one side or other side of the common conveying rail 13 and the operation rail 12. When the connection rail 14 is positioned at the one side of the common conveying rail 13 and the operation rail 12, the material 200 is conveyed to a feed port of the common conveying rail 13 or the operation rail 12 via a discharge port of the connection rail 14. When the connection rail 14 is positioned at the other side of the common conveying rail 13 and the operation rail 12, the material 200 is conveyed to a feed port of the connection rail 14 from a discharge port of the common conveying rail 13 or the operation rail 12.

In particular, the operation rail 12 is provided on the base frame 11, the common conveying rail 13 is provided on the base frame 11 and is spaced apart from the operation rail 12. The feed port of the common conveying rail 13 and the feed port of the operation rail 12 are on a same side, the discharge port of the common conveying rail 13 and the discharge port of the operation rail 12 are on other same side. The connection rail 14 is movably provided on the base frame 11, and is positioned at one side or the other side of the common conveying rail 13 and the operation rail 12. When the connection rail 14 is positioned at the one side of the common conveying rail 13 and the operation rail 12, the material 200 is conveyed to the feed port of the common conveying rail 13 or the operation rail 12 via the discharge port of the connection rail 14. When the connection rail 14 is positioned at the other side of the common conveying rail 13 and the operation rail 12, the material 200 is conveyed to the feed port of the connection rail 14 from the discharge port of the common conveying rail 13 or the operation rail 12 The operation unit is provided on the base frame 11 and is opposite to the operation rail 12 to perform processing on the material 200 on the operation rail 12.

In other words, the material conveying device 100 includes the base frame 11, the operation rail 12, the common conveying rail 13, the connection rail 14 and the operation unit. The material conveying device 100 has the function of processing. The base frame 11 may be installed thereon with the operation rail 12, the common conveying rail 13 and the connection rail 14. The common conveying rail 13 and the operation rail 12 may be provided in parallel with each other. The feed port of the common conveying rail 13 and the feed port of the operation rail 12 may be on a same side, the discharge port of the common conveying rail 13 and the discharge port of the operation rail 12 may be on other same side. When the connection rail 14 is positioned on the one side of the common conveying rail 13 and the operation rail 12, the supplied material first flows onto the connection rail 14, and then it is determined whether the material 200 is to be placed onto the common conveying rail 13 or the operation rail 12. After the determination, the connection rail 14 may move to a corresponding position to convey the material 200 to the corresponding position. It needs to be noted that, the determination may be performed manually or by a detection part such as a Camera Compact Module (CCM) and a sensor. The base frame 11 may be installed with an operation unit corresponding to the operation rail 12. The operation unit can perform operations such as processing and detection on the material 200. A processing equipment 10 can be formed by connecting material conveying devices 100 in series.

According to an embodiment of the present disclosure, the operation rail 12 and the common conveying rail 13 are provided in parallel with each other, which is not only convenient for installation, but also benefit for movement of the connection rail 14 between the operation rail 12 and the common conveying rail 13. Therefore, the efficiency of the material 200 flowing from the connection rail 14 onto the operation rail 12 or the common conveying rail 13 or the efficiency of the material 200 flowing from the operation rail 12 or the common conveying rail 13 onto the connection rail 14 can be increased.

As illustrated in FIG. 7 to FIG. 10, in some specific embodiments of the present disclosure, there are two connection rails 14. One of the two connection rails 14 is positioned at one side of the common conveying rail 13 and the operation rail 12, the other of the two connection rails 14 is positioned at the other side of the common conveying rail 13 and the operation rail 12. In other words, each material conveying device 100 may be provided therein with two connection rails 14 which are provided at two sides of the common conveying rail 13 and the operation rail 12 respectively. In this way, the production efficiency and flexibility can be further improved.

According to an embodiment of the present disclosure, the material conveying device 100 further includes a driving part. The driving part may be a part of the transfer assembly 40. The driving part is provided on the base frame 11 and is connected with the connection rail 14. The driving part can drive the connection rail 14 to move between the operation rail 12 and the common conveying rail 13, to allow the connection rail 14 to be in communication with the operation rail 12 or the common conveying rail 13. The driving part can further improve the degree of automation.

In some specific embodiments of the present disclosure, the material conveying device 100 further includes a sliding rail 15. The sliding rail 15 may be a part of the transfer assembly 40. The sliding rail 15 is provided on the base frame 11 and is movably connected with the connection rail 14. The connection rail 14 can move between the operation rail 12 and the common conveying rail 13 along the sliding rail 15, which is convenient for the connection rail 14 to move between the common conveying rail 13 and the operation rail 12 so as to improve the stability of movement.

According to an embodiment of the present disclosure, the operation rail 12, the common conveying rail 13 and the connection rail 14 are parallel with each other, which can not only improve the structural compactness of the device and reduce the space occupation, but also improve the efficiency of conveyance of the material 200 between the connection rail 14 and the operation rail 12 or the common conveying rail 13.

The extending direction of the sliding rail 15 is the same with the moving direction of the connection rail 14, and is perpendicular to the extending direction of the operation rail 12. In this way, conveyance of the material 200 between the operation rail 12 and the connection rail 14 is convenient.

Optionally, in two material conveying devices 100 which are adjacent to each other, two operation rails 12 thereof are coaxial, and two common conveying rails 13 thereof are coaxial, so as to improve the efficiency of conveyance of the material 200.

According to an embodiment of the present disclosure, each material conveying device 100 has one or more common conveying rails 13 and one or more operation rails 12. That is, the number of the common conveying rail(s) 13 may be one or greater than one, the number of the operation rail(s) 12 may be one or greater than one, and the specific number of the common conveying rail(s) 13 and the specific number of the operation rail(s) 12 may be set according to needs.

In some specific embodiments of the present disclosure, the processing equipment 10 further includes a controller connected with the connection rails 14. When the operation rail 12 of one material conveying device 100 is loaded with a material 200, the controller drives a connection rail 14 to convey a next material 200 to the common conveying rail 13 of the one material conveying device 100, and convey the next material 200 by another connection rail 14 to the operation rail 12 of another material conveying device 100 adjacent to the one material conveying device 100. In particular, when it is detected that the operation rail 12 of one material conveying device 100 is loaded with a material 200, the controller may control and drive a connection rail 14 to convey a subsequent material 200 to be processed to the common conveying rail 13 of the one material conveying device 100, and convey the subsequent material 200 to be processed to the operation rail 12 or the common conveying rail 13 of another material conveying device 100 adjacent to the one material conveying device 100 by another connection rail 14 between the one material conveying device 100 and the another material conveying device 100.

According to an embodiment of the present disclosure, the material conveying device 100 further includes a determination module, a distribution module and a drive module. In particular, the determination module is configured to determine whether there is a material 200 being processed on the operation rail 12 of a material conveying device 100. The distribution module is configured to move between the operation rail 12 and the common conveying rail 13 in parallel with the operation rail 12 to convey a material 200 to the operation rail 12 or the common conveying rail 13. The drive module is connected with the determination module and the distribution module and is configured to drive the distribution module to move between the operation rail 12 and the common conveying rail 13 based on the result of the determination.

When the connection rail 14 is positioned at one side of the common conveying rail 13 and the operation rail 12, a supplied material first flows into the connection rail 14. Then, it is determined based on a determination result of the determination module, whether the material 200 is to be conveyed onto the common conveying rail 13 or the operation rail 12. After this determination, the drive module drives the connection rail 14 to move to the determined position and conveys the material 200 to the determined position. It needs to be noted that, the determination module may include a Camera Compact Module (CCM), a sensor, etc. The operation unit corresponds to the common conveying rail 13, and may perform operations such as processing and detection on the material 200.

For example, when there is a material 200 being processed on the operation rail 12 of one material conveying device 100, the distribution module at one side of the one material conveying device 100 conveys a next material 200 after the material 200 to the common conveying rail 13 of the one material conveying device 100, and conveys the next material 200, by a distribution module between two material conveying devices 100 adjacent to each other, to the operation rail 12 or the common conveying rail 13 of another material conveying device 100.

According to an embodiment of the present disclosure, the drive module may include a drive motor. The drive module may drive the connection rail 14 to move between the operation rail 12 and the common conveying rail 13 to allow the connection rail 14 to be in communication with the operation rail 12 or the common conveying rail 13. The drive module can further improve the degree of automation.

According to an embodiment of the present disclosure, each material conveying device 100 includes one or more common conveying rails 13 and one or more operation rails 12. That is, the number of the common conveying rail(s) 13 may be one or greater than one, the number of the operation rail(s) 12 may be one or greater than one, and the specific number of the common conveying rail(s) 13 and the specific number of the operation rail(s) 12 may be set according to needs.

As illustrated in FIG. 7 to FIG. 12, the processing equipment 10 facilitating distribution of material 200 according to embodiments of the present disclosure includes at least two material conveying devices 100 connected in series, and the transfer assembly may be provided at each of a feed side and a discharge side of each of the at least two material conveying devices 100. In particular, a connection rail 14 is provided between two material conveying devices 100 adjacent to each other.

Therefore, with the at least two material conveying devices 100 connected in series, each of the at least two material conveying devices 100 may be provided with a common conveying rail 13 and an operation rail 12 in parallel. The parallel rails in two material conveying devices 100 adjacent to each other may improve the flexibility of distributing the material 100, preventing the occurrence of a phenomenon in which a material 200 is being processed and a subsequent material 200 waits too long.

It needs to be noted that, when there are three material conveying devices 100, the three material conveying devices 100 are sequentially connected. If the operation rail 12 of a first material conveying device 100 is loaded with a material 200 being processed, a connection rail 14 may convey a next material 200 to be processed to the operation rail 12 or the common conveying rail 13 of a second material conveying device 100. And when the next material 200 to be processed is conveyed to the common conveying rail 13 of the second material conveying device 100, a connection rail 14 may continue to convey the next material 200 to be processed on the common conveying rail 13 of the second material conveying device 100 to the operation rail 12 of a third material conveying device 100. In other words, the connection rail 14 may, based on whether the operation rail 12 of a material conveying device 100 is loaded with a material 200 being processed, choose to convey another material 200 to the operation rail 12 or the common conveying rail 13 of a next material conveying device 100 according to different needs and circumstances, for example, according to same, different, alternating or interlaced configurations of the operation units of multiple material conveying devices 100.

The material distribution method for a material 200 according to embodiments of a third aspect of the present disclosure will be described in detail below with reference to the accompanying drawings.

As illustrated in FIG. 6 to FIG. 12, the material distribution method for a material 200 according to embodiments of the present disclosure includes following steps.

At S1, it is determined whether there is a material 200 being processed on the first conveying unit 20 of one material conveying device 100. In particular, it is determined whether there is a material 200 being processed on the operation rail 12 of the first conveying unit 20.

At S2, a next material 200 after the material 200 is conveyed to the transfer assembly at one side of the one material conveying device 100 along a conveying direction. In particular, the next material 200 is conveyed to a corresponding connection rail 14 along the conveying direction, and waits for further distribution on the connection rail 14.

At S3, when the material 200 is being processed on the operation rail 12 of the first conveying unit 20 of the one material conveying device 100, the connection rail 14 of the transfer assembly at the one side of the one material conveying device 100 conveys the next material 200 to the common conveying rail 13 of the one material conveying device 100, and a connection rail 14 between two material conveying devices 100 adjacent to each other transfers the next material 200 to the first conveying unit 20 or the second conveying unit 30 of another material conveying device 100, i.e., to the corresponding operation rail 12 or the corresponding common conveying rail 13, that is, the connection rail 14 is driven to move to the common conveying rail 13 or the operation rail 12 based on a determination result at the step S1.

According to an embodiment of the present disclosure, when the operation units of two material conveying devices 100 adjacent to each other are the same, at step S3, a connection rail 14 at one side of one of the two material conveying devices 100 conveys a next material 200 to the common conveying rail 13 of the one of the two material conveying devices 100. Then, the next material 200 is transferred to the operation rail 12 of the other of the two material conveying devices 100.

In some specific embodiments of the present disclosure, the material distribution method for a material 200 further includes the following step. At S4, after the material 200 on the operation rail 12 of the one material conveying device 100 is processed, a connection rail 14 between the two material conveying devices 100 adjacent to each other transfers the processed material 200 to the operation rail 12 or the common conveying rail 13 of another material conveying device 100.

Optionally, at step S4, when the operation units of the two material conveying devices 100 adjacent to each other are the same, the connection rail 14 between the two material conveying devices 100 adjacent to each other conveys the processed material 200 to the common conveying rail 13 of the another material conveying device 100; and when the operation units of the two material conveying devices 100 adjacent to each other are not the same, the connection rail 14 between the two material conveying devices 100 adjacent to each other transfers the processed material 200 to the operation rail 12 of the another material conveying device 100.

According to an embodiment of the present disclosure, two connection rails 14 are provided between two material conveying devices adjacent to each other. A connection rail 14 is provided at each of two sides of each of the two material conveying devices 100. That is, for each of the two material conveying devices 100, one connection rail 14 is positioned at one side of the common conveying rail 13 and the operation rail 12, and another connection rail 14 is positioned at the other side of the common conveying rail 13 and the operation rail 12, which can further improve the production efficiency and the flexibility.

In some specific embodiments of the present disclosure, the operation rail 12, the common conveying rail 13 and the connection rail 14 are in parallel with each other, which can not only improve the structural compactness of the device and reduce the space occupation, but also improve the efficiency of the material 200 flowing between the connection rail 14 and the operation rail 12 or the common conveying rail 13.

According to an embodiment of the present disclosure, two operation rails 12 of two material conveying devices 100 adjacent to each other are coaxial, and two common conveying rails 13 of the two material conveying devices 100 adjacent to each other are coaxial, which can improve the conveying efficiency of the material 200.

Based on the above, the material distribution method for a material 200 according to embodiments of the present disclosure, can not only enable connection of multiple material conveying devices 100, but also improve the efficiency of distributing and processing the material 200 so as to prevent the material 200 from waiting too long in the above connection of the multiple material conveying devices, which would otherwise cause jam.

The material distribution method for a material 200 and the material processing device 100 according to embodiments of the present disclosure will be described in detail in the follows with reference to specific embodiments.

Embodiment 1

Figure 4:
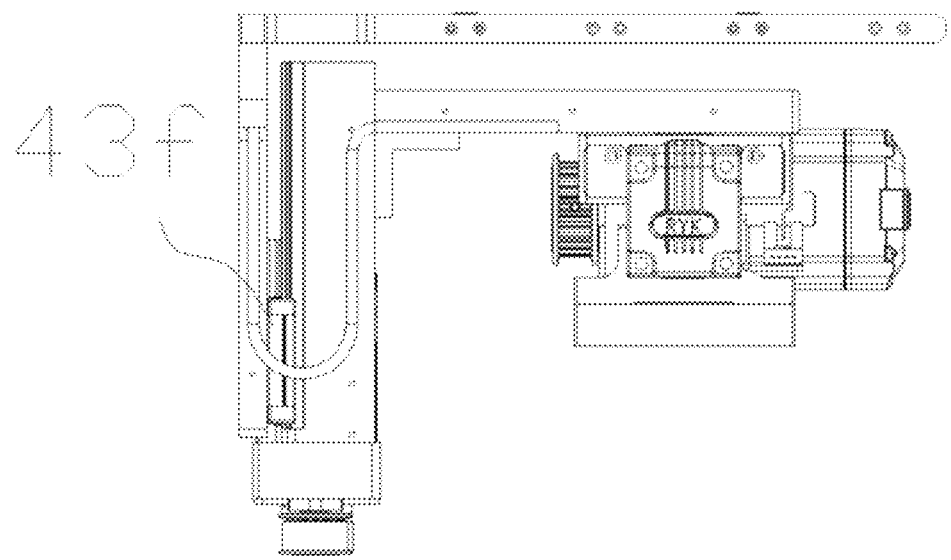
FIG. 4 is a right view of the transfer assembly of the material conveying device according to the embodiment of the present disclosure.
Figure 9:
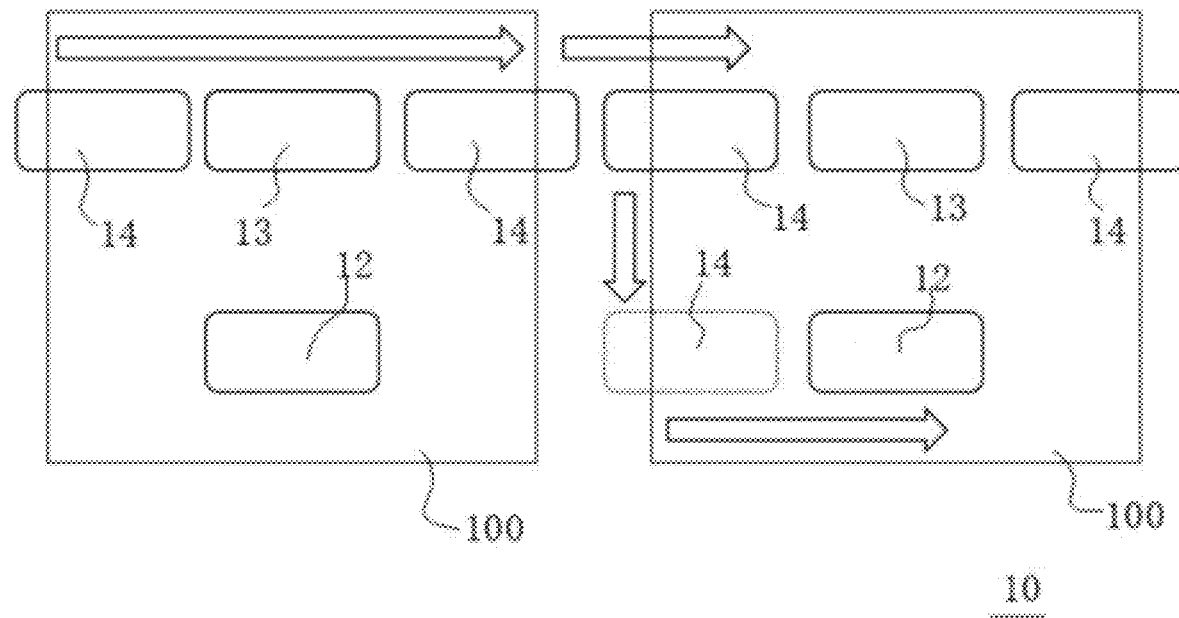
FIG. 9 is a schematic diagram illustrating a material distribution method according to an embodiment of the present disclosure.

As illustrated in FIG. 4 and FIG. 9, when there is a material 200 being processed on the operation rail 12 of the material conveying device 100 on the left, another material is supplied and is to be processed. In this case, the another material 200 may, along the arrow direction in FIG. 4 and FIG. 9, sequentially passes through a connection rail 14, the common conveying rail 13 and another connection rail 14 of the material conveying device 100 on the left, then flows onto a corresponding connection rail 14 of the material conveying device 100 on the right, and then is transferred and conveyed by the corresponding connection rail 14 to the operation rail 12 of the material conveying device 100 on the right for processing.

Embodiment 2

Figure 5:
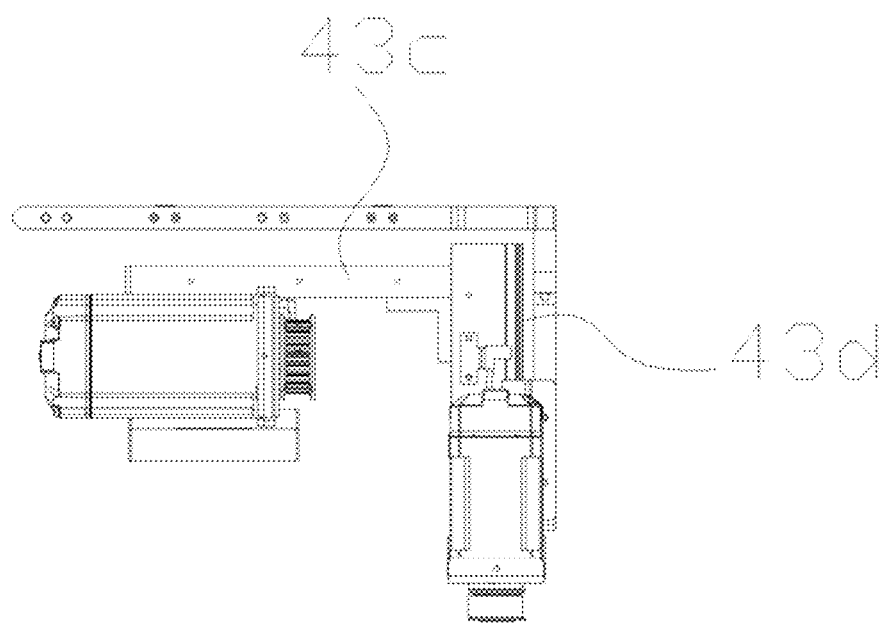
FIG. 5 is a left view of the transfer assembly of the material conveying device according to the embodiment of the present disclosure.
Figure 6:
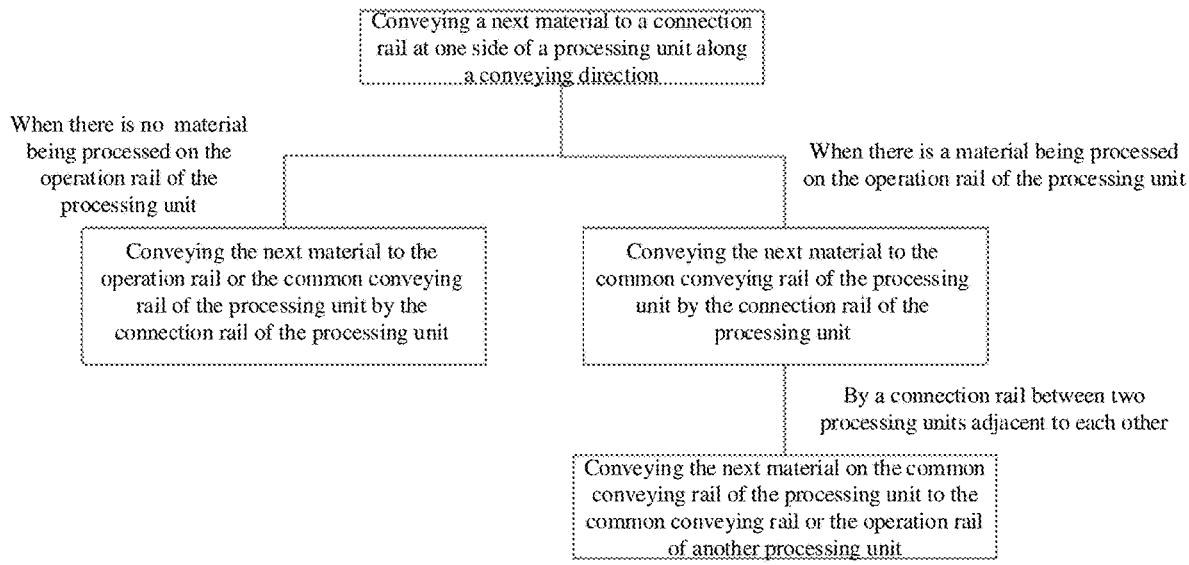
FIG. 6 is a schematic flowchart of a material distribution method according to embodiments of the present disclosure.
Figure 10:
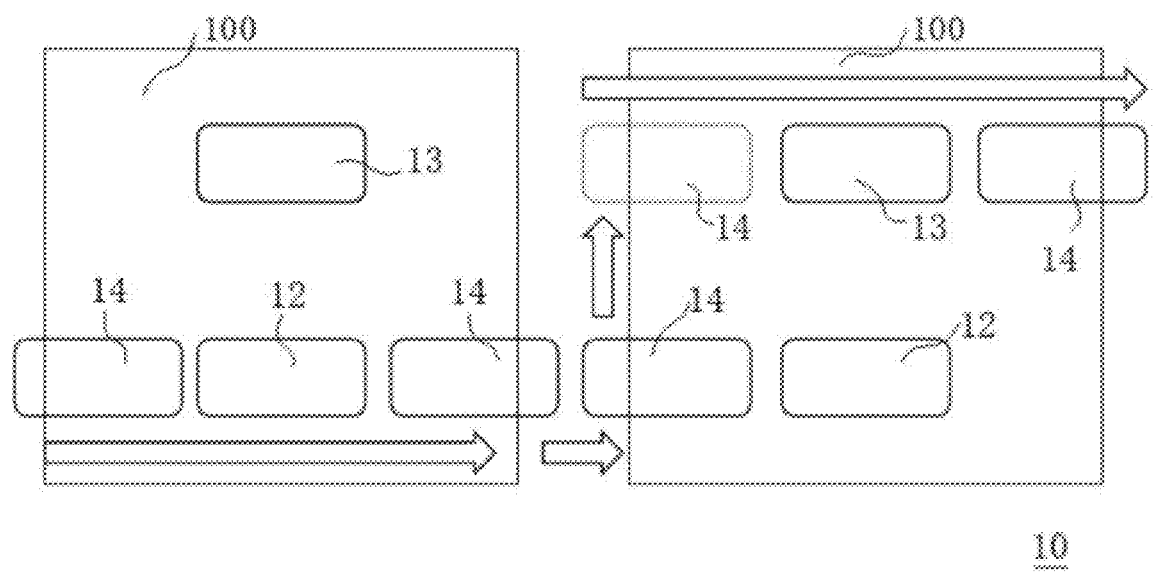
FIG. 10 is a schematic diagram illustrating a material distribution method according to another embodiment of the present disclosure.
Figure 11:
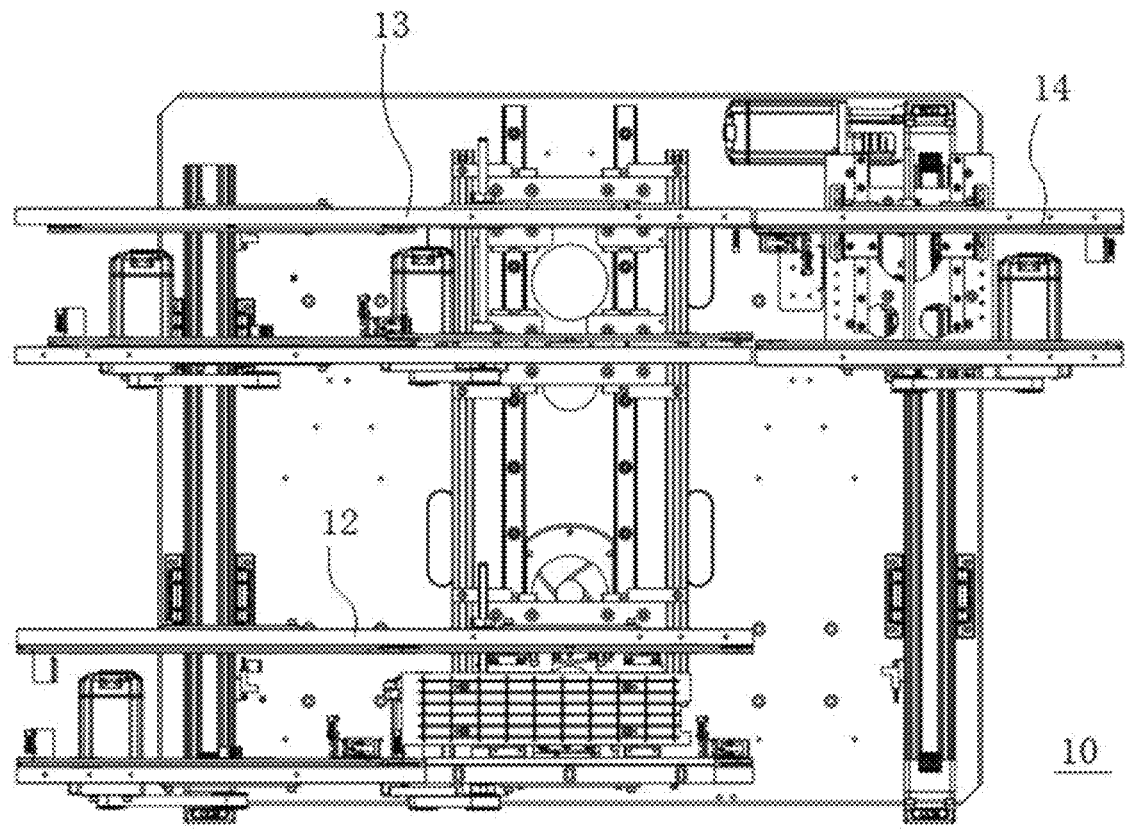
FIG. 11 is a schematic diagram illustrating a structure of the processing unit according to another embodiment of the present disclosure.

As illustrated in FIG. 5, FIG. 6, and FIG. 10, when the processing of the material 200 on the operation rail 12 of the material conveying device 100 on the left is finished, the material 200 may, along the arrow direction, flow onto a corresponding connection rail 14 of the material conveying device 100 on the right via a corresponding connection rail 14 of the material conveying device 100 on the left, then may be transferred and conveyed by the corresponding connection rail 14 of the material conveying device 100 on the right, to the common conveying rail 13 of the material conveying device 100 on the right, and then may be conveyed by another corresponding connection rail 14 of the material conveying device 100 on the right onto a machine in a following procedure.

Embodiment 3

Figure 7:
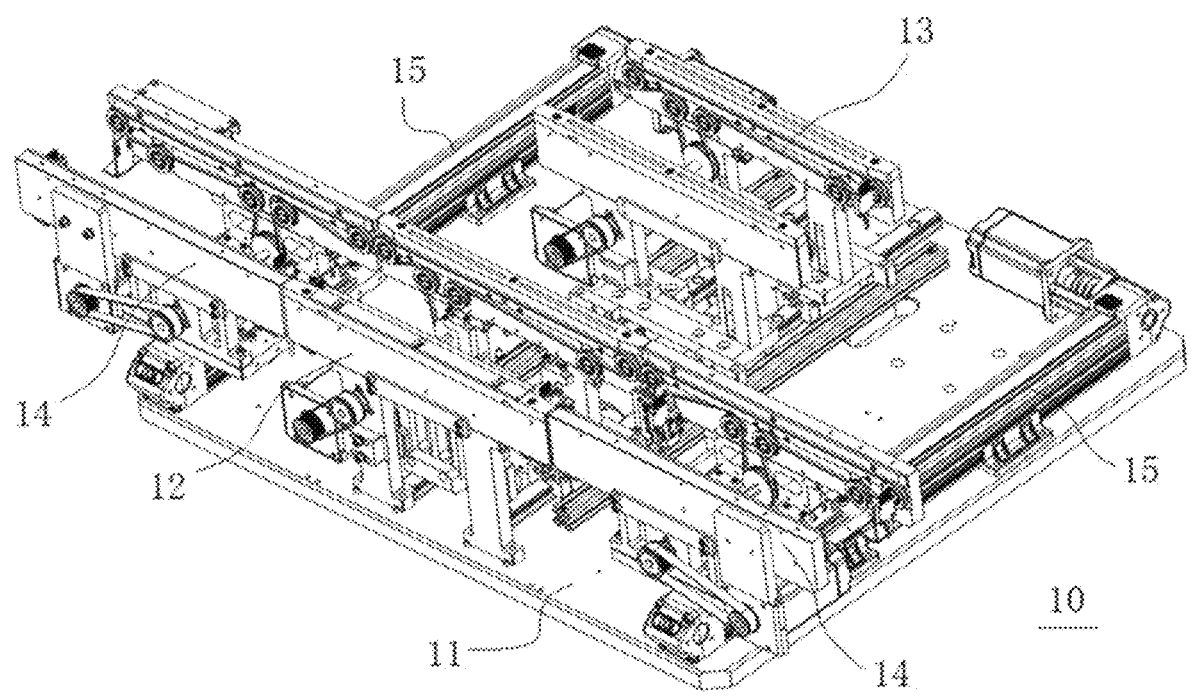
FIG. 7 is a schematic diagram illustrating a structure of a processing unit according to an embodiment of the present disclosure.
Figure 8:
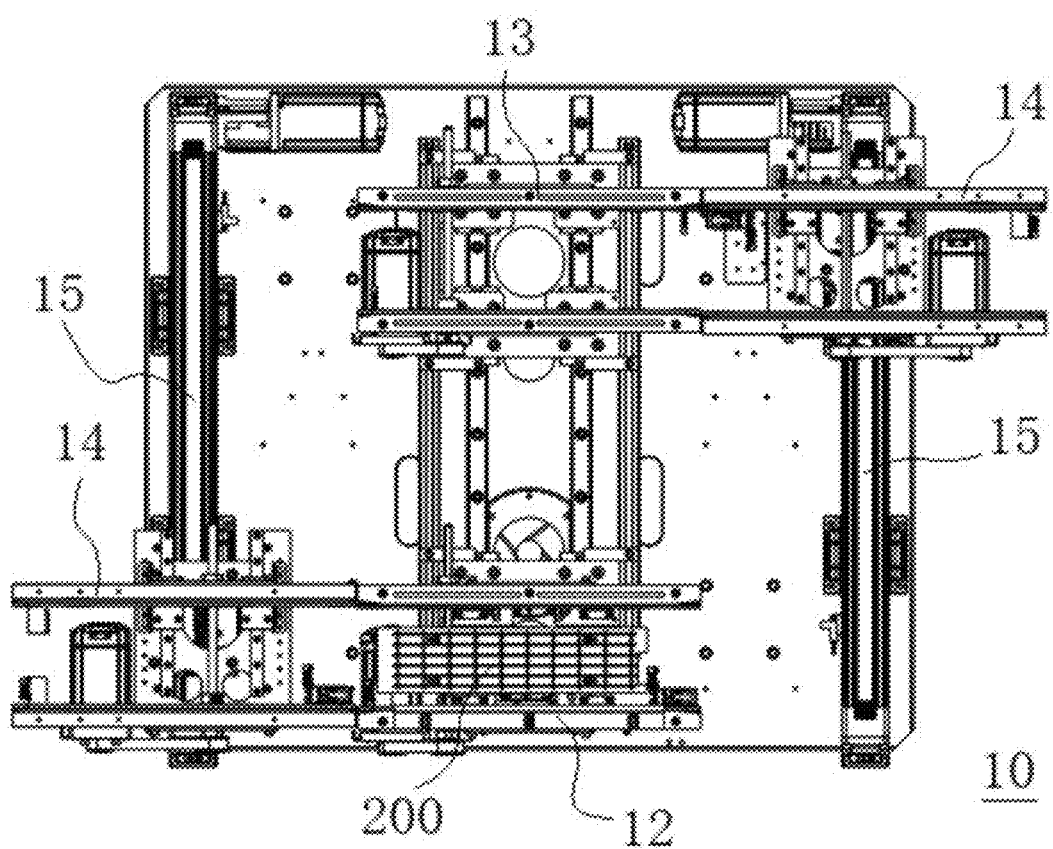
FIG. 8 is a top view illustrating a processing unit according to an embodiment of the present disclosure.
Figure 12:
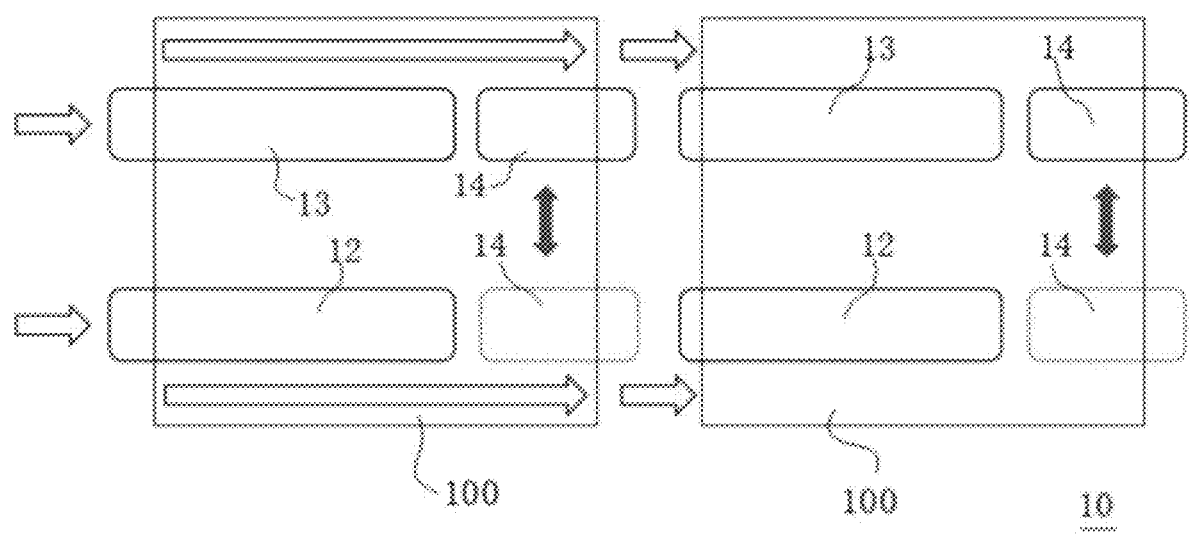
FIG. 12 is a schematic diagram illustrating a material distribution method according to still another embodiment of the present disclosure.

As illustrated in FIG. 6, FIG. 7 and FIG. 12, along the hollow arrow direction, the material 200 is supplied from an equipment in a previous procedure onto the common conveying rail 13 or the operation rail 12 of the material conveying device 100 on the left. When the material 200 flows onto a corresponding connection rail 14 of the material conveying device 100 on the left, the material 200 is distributed by the corresponding connection rail 14. The corresponding connection rail 14 conveys the material 200 onto the common conveying rail 13 or the operation rail 12 of the material conveying device 100 on the right. Finally, the material 200 is distributed and conveyed towards a following procedure by a corresponding connection rail 14 of the material conveying device 100 on the right. These connection rails 14 may move along the solid arrow direction illustrated in FIG. 12.

Based on the above, with the material conveying device 100 according to embodiments of the present disclosure, one or more materials 200 on at least two serially connected material conveying devices 100 can be distributed. Each of the material conveying devices 100 may be provided therein with the common conveying rail 13 and the operation rail 12 in parallel with each other, and the connection rail 14 between two material conveying devices 100 adjacent to each other can choose to convey the material 200 onto the common conveying rail 13 or the operation rail 12, which can prevent the problem of a material 200 waiting for a previous material 200 too long and thus can effectively improve the operating efficiency.

Further, a computer storage medium according to an embodiment of the present disclosure is provided. The computer storage medium may include one or more computer instructions which when executed, implement the material distribution method according to any of the above embodiments of the present disclosure.

That is, the computer storage medium may store a computer program which, when executed by a processor, enables the processor to perform the material distribution method according to any of the above embodiments of the present disclosure.

An electronic device according to an embodiment of the present disclosure is provided. The electronic device may include a memory and a processor. The memory may be configured to store one or more computer instructions. The processor may be configured to invoke and execute the one or more computer instructions to implement the material distribution method according to any of the above embodiments of the present disclosure.

That is, the electronic device may include the memory and the processor. The memory stores one or more computer program instructions which, when executed by the processor, enable the processor to perform the material distribution method according to any of the above embodiments of the present disclosure.

Further, the electronic device may further include a network interface, an input device, a hard disk and a display device.

The above interface and various devices can be interconnected via a bus architecture. The bus architecture may include any number of interconnected buses and bridges. In particular, various circuits such as one or more Central Processing Units (CPUs) represented by the processor and one or more memories represented by the memory are connected together. The bus architecture may further connect various other circuits such as a peripheral device, a voltage stabilizer and a power management circuitry together. It may be understood that the bus architecture is configured to realize connection and communication among these components. Apart from a data bus, the bus architecture may include a power supply bus, a control bus and a status signal bus. All of these buses are known in the art and their detailed description is omitted here.

The network interface may be connected to a network such as internet or Local Area Network) to acquire associated data from the network and to store the acquired associated data into the hard disk.

The input device may be configured to receive various instructions input by an operator, and send the received various instructions to the processor for execution by the processor. The input device may include a keyboard or a pointing device, such as a mouse, a trackball, a touch pad or a touch panel.

The display device may display the result obtained after execution of instructions by the processor.

The memory may be configured to store program and data required for the operation of an operating system and other data such as an intermediate result during the calculation executed by the processor.

It may be understood that the memory in the embodiments of the present disclosure may be a transitory memory, a non-transitory memory, or both. The non-transitory memory may be a Read-Only Memory (ROM), a Programmable Read-Only Memory (PROM), an Erasable Programmable Read-Only Memory (EPROM), an Electrically Erasable Programmable Read-Only Memory (EEPROM) or a flash memory. The transitory memory may be a Random Access Memory (RAM) used as an external cache. The memory in the device and method of the present disclosure is intended to include, but not limited to, these and any other suitable types of memories.

In some embodiments, the memory may store elements such as an executable module or a data structure, or subsets or extension sets thereof, an operating system and an application.

Here, the operating system may include various system programs, for example, a frame layer, a core library layer, a driver layer, etc., so as to implement various basic services and process hardware-based tasks. The application may include various applications such as a browser, so as to implement various application services. The program for implementing the material distribution method according to any of the above embodiments of the present disclosure may be included in the application.

When invoking and executing an application and data stored in the memory, particularly when invoking and executing programs or instructions stored in the application, the processor may send dispersedly one of a first set and a second set to a node where the other of the first and second sets is positioned. The other may be stored dispersedly in at least two nodes. The processor may perform an intersection process node by node according to node distributions of the first and second sets.

The method according to the above embodiments of the present disclosure may be applied in the processor or realized by the processor. The processor may be an integrated circuit chip capable of processing signals. In realization, the steps in the material distribution method may be performed by a hardware-form integrated logic circuit or software-form instructions in the processor. The above processor may be a general processor, a Digital Signal Processor (DSP), an Application Specific Integrated Circuit (ASIC), a Field Programmable Gate Array (FPGA) or other programmable logic device, a discrete gate or a transistor logic device, a discrete hardware component, and can realize or implement the method, step or logic block diagram in the embodiments of the present disclosure. The general processor may be a microprocessor or any other conventional processor. The steps of the method in the embodiments of the present disclosure may be directly embodied as being executed by a hardware decoding processor, or a combination of a hardware module and a software module in the decoding processor. The software module may be positioned in a storage medium known in the art, such as a random memory, a flash memory, a read-only memory, a programmable read-only memory or an electrically erasable programmable memory, a register and so on. The storage medium may be positioned in the memory. The processor may read information in the memory and execute steps in the method in cooperation with a hardware thereof.

It may be understood that the embodiments of the present disclosure may be realized with hardware, software, firmware, middleware, microcode or combinations thereof. For hardware, the processor may be realized in one or more Application Specific Integrated Circuits (ASICs), Digital Signal Processing Devices (DSPs), Digital Signal Processing Devices (DSPDs), Programmable Logic Devices (PLDs), Field Programmable Gate Arrays (FPGAs), general processors, controllers, micro controllers, microprocessors and other electronic units for implementing the functions disclosed in the present disclosure or combinations thereof.

For software, the technical solution of the present disclosure may be realized by modules (such as processes or functions) having the functions disclosed herein. The software codes may be stored in the memory and executed by the processor. The memory may be realized in the processor or outside the processor.

Particularly, the processor may be further configured to read the above computer program to perform the material distribution method according to any of the above embodiments of the present disclosure.

It shall be understood that, in the embodiments of the present disclosure, the method and apparatus may be realized in other ways. For example, the embodiments of the apparatus described above are only exemplary, e.g., the classification of units are only based on classification of logic functions, but may be classified in other ways in actual implementation, e.g., several units or components may be combined or integrated into another system, or some features may be ignored or not executed. In addition, the displayed or discussed coupling or direct coupling or communication connection may be indirect coupling or communication connection via some interfaces, devices or units, or may be an electric connection, a mechanic connection or other connection ways.

In addition, the functional units in the embodiments of the present disclosure may be integrated into one processing unit or physically separate, or two or more functional units may be integrated into one unit. The above integrated unit may be realized in hardware or combination of hardware and software functional units.

The integrated unit implemented in a software functional unit may be stored in a computer-readable storage medium. The above software functional unit may be stored in a storage medium and may include instructions to cause a computer device (which may be a personal computer, a server or a network device) to perform part of the steps of transmitting-receiving process in the embodiments of the present disclosure. The above storage medium may include various mediums which can store program codes, such as a U-disk, removable hard disk, a Read-Only Memory (ROM for short), a Random Access Memory (RAM for short), a magnetic disk or an optic disk.

In the description of the present disclosure, it shall be understood that, terms such as "center", "longitudinal", "crosswise", "length", "width", "thickness", "up", "down", "front", "back", "left", "right", "vertical", "horizontal", "top", "bottom", "inside", "outside", "clockwise", "counter-clockwise", "axial", "radial", "circumferential" and others illustrating orientational or positional relations, are all on the basis of the orientational or positional relations illustrated in the drawings for convenience of simpleness of the description of the present disclosure, do not indicate or imply that the devices or elements must have a specific orientation or must be constructed and operated in a specific orientation and thus cannot construed as limiting the present disclosure.

In the description of the present disclosure, the description with reference to the terms "one embodiment", "some embodiments", "exemplary embodiments", "example", "specific example", or "some examples", etc., means that specific features, structures, materials, or characteristics described in conjunction with the embodiment(s) or example(s) are included in at least one embodiment or example of the present disclosure. In the present disclosure, any illustrative reference of the above terms does not necessarily refer to the same embodiment(s) or example(s).

Although the embodiments of the present disclosure have been shown and described above, it can be appreciated by those of ordinary skill in the art that various changes, modifications, replacements and variants can be made to the above embodiments without departing from the principle and the spirit of the present disclosure. The scope of the disclosure is defined by claims and equivalents thereof.

The invention claimed is:

1. A material conveying device, comprising:
a base frame,
a first conveying unit provided on the base frame;
a second conveying unit provided on the base frame; and
a transfer assembly provided on the base frame and configured to transfer a material between the first conveying unit and the second conveying unit,
wherein the transfer assembly comprises: a material reversing module which is provided on the base frame and is movable between the first conveying unit and the second conveying unit, and a material fetching module connected with the material reversing module, the material fetching module being configured to move between a port position of the first conveying unit and a port position of the second conveying unit when driven by the material reversing module to transfer the material between the first conveying unit and the second conveying unit;
wherein the transfer assembly further comprises an elevating module connected with each of the material reversing module and the material fetching module, and the elevating module is configured to raise or lower a height where the material fetching module is located;
wherein the material reversing module comprises a reversing movement member and a reverse driving member, the reversing movement member is provided on the base frame and is connected with the elevating module, the reverse driving member is provided on the base frame and is connected with the reversing movement member, and the reverse driving member is configured to drive the reversing movement member to move;
wherein the elevating module comprises an elevation moving member and an elevation driving member, the elevation moving member is connected with both of the reversing movement member and the material fetching module, and the elevation driving member is connected with the elevation moving member to drive the elevation moving member to drive the material fetching module to fetch the material from the first conveying unit or the second conveying unit or to place the material onto the first conveying unit or the second conveying unit;
wherein the reversing movement member comprises a reversing movement member base plate, a reversing movement member body and a reversing movement member moving block, the reversing movement member base plate is provided on the base frame, the reversing movement member body is connected with the base frame by the reversing movement member base plate, the reversing movement member body is provided between the first conveying unit and the second conveying unit, and the reversing movement member moving block is movably provided on the reversing movement member body; and
wherein the elevation moving member comprises an elevation moving member base plate, an elevation moving member body, an elevation moving member screw pair and an elevation moving member sliding pair, the elevation moving member base plate is connected with the reversing movement member moving block, the elevation moving member body is connected with the elevation moving member base plate, the elevation moving member screw pair is connected with the elevation driving member, the elevation moving member sliding pair is connected with both of the elevation moving member screw pair and the material fetching module, and the elevation moving member sliding pair is configured to drive the material fetching module to move up and down on the elevation moving member body by the elevation moving member screw pair.

2. The material conveying device according to claim 1, wherein the material fetching module comprises:
a bracket base plate connected with the elevation moving member screw pair,
a bracket connected with the bracket base plate; and
a suction member connected with the bracket and configured to generate a suction force on the material.

3. The material conveying device according to claim 2, wherein the suction member comprises a sucking disc provided with a bearing surface for suctioning the material, and the position of the sucking disc on the bracket is adjustable.

4. The material conveying device according to claim 1, wherein the first conveying unit and the second conveying unit each comprise a sliding rail provided thereon with a transmission member for bearing and conveying the material, the number of the sliding rails is two, the two sliding rails are provided spaced apart from and opposite to each other, and a distance between the two sliding rails is adjustable.

5. The material conveying device according to claim 1, wherein the first conveying unit comprises an operation rail, the operation unit is provided on the first conveying unit, the second conveying unit comprises a common conveying rail, the transfer assembly comprises a connection rail which is movably provided on the base frame, the connection rail is positioned at one side or other side of the common conveying rail and the operation rail, wherein when the connection rail is positioned at the one side of the common conveying rail and the operation rail, the material is conveyed to a feed port of the common conveying rail or the operation rail via a discharge port of the connection rail, and when the connection rail is positioned at the other side of the common conveying rail and the operation rail, the material is conveyed from a discharge port of the common conveying rail or the operation rail to a feed port of the connection rail.

6. The material conveying device according to claim 5, wherein the operation rail and the common conveying rail are provided in parallel with each other.

7. The material conveying device according to claim 5, the number of the connection rails are two, and one of the two connection rails is positioned at one side of the common conveying rail and the operation rail, the other of the two connection rails is positioned at the other side of the common conveying rail and the operation rail.

8. The material conveying device according to claim 5, the operation rail, the common conveying rail and the connection rail are parallel with each other.

9. A processing equipment facilitating material distribution, comprising at least two material conveying devices which are connected in series, the transfer assembly is provided at each of a feed side and a discharge side of each of the at least two material conveying devices, wherein each of the at least two material conveying devices comprises:
a base frame,
a first conveying unit provided on the base frame;
a second conveying unit provided on the base frame; and
a transfer assembly provided on the base frame and configured to transfer a material between the first conveying unit and the second conveying unit,
wherein the transfer assembly comprises: a material reversing module which is provided on the base frame and is movable between the first conveying unit and the second conveying unit, and a material fetching module connected with the material reversing module, the material fetching module being configured to move between a port position of the first conveying unit and a port position of the second conveying unit when driven by the material reversing module to transfer the material between the first conveying unit and the second conveying unit;
wherein the transfer assembly further comprises an elevating module connected with each of the material reversing module and the material fetching module, and the elevating module is configured to raise or lower a height where the material fetching module is located;
wherein the material reversing module comprises a reversing movement member and a reverse driving member, the reversing movement member is provided on the base frame and is connected with the elevating module, the reverse driving member is provided on the base frame and is connected with the reversing movement member, and the reverse driving member is configured to drive the reversing movement member to move;
wherein the elevating module comprises an elevation moving member and an elevation driving member, the elevation moving member is connected with both of the reversing movement member and the material fetching module, and the elevation driving member is connected with the elevation moving member to drive the elevation moving member to drive the material fetching module to fetch the material from the first conveying unit or the second conveying unit or to place the material onto the first conveying unit or the second conveying unit;
wherein the reversing movement member comprises a reversing movement member base plate, a reversing movement member body and a reversing movement member moving block, the reversing movement member base plate is provided on the base frame, the reversing movement member body is connected with the base frame by the reversing movement member base plate, the reversing movement member body is provided between the first conveying unit and the second conveying unit, and the reversing movement member moving block is movably provided on the reversing movement member body; and
wherein the elevation moving member comprises an elevation moving member base plate, an elevation moving member body, an elevation moving member screw pair and an elevation moving member sliding pair, the elevation moving member base plate is connected with the reversing movement member moving block, the elevation moving member body is connected with the elevation moving member base plate, the elevation moving member screw pair is connected with the elevation driving member, the elevation moving member sliding pair is connected with both of the elevation moving member screw pair and the material fetching module, and the elevation moving member sliding pair is configured to drive the material fetching module to move up and down on the elevation moving member body by the elevation moving member screw pair.

10. A material distribution method, applied in a processing equipment facilitating material distribution, wherein the processing equipment facilitating material distribution comprises at least two material conveying devices which are connected in series, the transfer assembly is provided at each of a feed side and a discharge side of each of the at least two material conveying devices, wherein each of the at least two material conveying devices comprises:
a base frame,
a first conveying unit provided on the base frame;
a second conveying unit provided on the base frame; and
a transfer assembly provided on the base frame and configured to transfer a material between the first conveying unit and the second conveying unit,
wherein the transfer assembly comprises: a material reversing module which is provided on the base frame and is movable between the first conveying unit and the second conveying unit, and a material fetching module connected with the material reversing module, the material fetching module being configured to move between a port position of the first conveying unit and a port position of the second conveying unit when driven by the material reversing module to transfer the material between the first conveying unit and the second conveying unit;
wherein the transfer assembly further comprises an elevating module connected with each of the material reversing module and the material fetching module, and the elevating module is configured to raise or lower a height where the material fetching module is located;
wherein the material reversing module comprises a reversing movement member and a reverse driving member, the reversing movement member is provided on the base frame and is connected with the elevating module, the reverse driving member is provided on the base frame and is connected with the reversing movement member, and the reverse driving member is configured to drive the reversing movement member to move;

wherein the elevating module comprises an elevation moving member and an elevation driving member, the elevation moving member is connected with both of the reversing movement member and the material fetching module, and the elevation driving member is connected with the elevation moving member to drive the elevation moving member to drive the material fetching module to fetch the material from the first conveying unit or the second conveying unit or to place the material onto the first conveying unit or the second conveying unit;

wherein the reversing movement member comprises a reversing movement member base plate, a reversing movement member body and a reversing movement member moving block, the reversing movement member base plate is provided on the base frame, the reversing movement member body is connected with the base frame by the reversing movement member base plate, the reversing movement member body is provided between the first conveying unit and the second conveying unit, and the reversing movement member moving block is movably provided on the reversing movement member body; and wherein the elevation moving member comprises an elevation moving member base plate, an elevation moving member body, an elevation moving member screw pair and an elevation moving member sliding pair, the elevation moving member base plate is connected with the reversing movement member moving block, the elevation moving member body is connected with the elevation moving member base plate, the elevation moving member screw pair is connected with the elevation driving member, the elevation moving member sliding pair is connected with both of the elevation moving member screw pair and the material fetching module, and the elevation moving member sliding pair is configured to drive the material fetching module to move up and down on the elevation moving member body by the elevation moving member screw pair wherein the material distribution method comprises:

determining (S1) whether there is a material being processed on the first conveying unit of one material conveying device;

conveying (S2) a next material after the material to the transfer assembly positioned at one side of the one material conveying device along a conveying direction; and conveying (S3) by the transfer assembly positioned at the one side of the one material conveying device, the next material to the second conveying unit of the one material conveying device and transferring by the transfer assembly between two material conveying devices adjacent to each other, the next material to the first conveying unit or the second conveying unit of another material conveying device, when the material is being processed on the first conveying unit of the one material conveying device.

11. The material distribution method according to claim 10, further comprising:

transferring (S4), after the material on the first conveying unit of the one material conveying device is processed, by the transfer assembly between the two material conveying devices adjacent to each other, the processed material to the first conveying unit or the second conveying unit of the another material conveying device.

12. The material conveying device according to claim 1, wherein an operation unit is provided on the first conveying unit and/or the second conveying unit.

13. The material conveying device according to claim 12, wherein the operation unit is configured to perform processing and detection on the material.

* * * * *